(12) United States Patent
Wilmot et al.

(10) Patent No.: US 9,006,385 B2
(45) Date of Patent: Apr. 14, 2015

(54) ELASTOMERIC EPOXY MATERIALS AND THE USE THEREOF

(75) Inventors: Nathan Wilmot, Missouri City, TX (US); Rajat Duggal, Pearland, TX (US); Juan Carlos Medina, Lake Jackson, TX (US); Harshad M. Shah, Missouri City, TX (US); Alan K. Schrock, Pensacola Beach, FL (US)

(73) Assignee: Dow Global Technologies LLC, Midland, MI (US)

( * ) Notice: Subject to any disclaimer, the term of this patent is extended or adjusted under 35 U.S.C. 154(b) by 97 days.

(21) Appl. No.: 13/819,580

(22) PCT Filed: Aug. 31, 2011

(86) PCT No.: PCT/US2011/049978
§ 371 (c)(1),
(2), (4) Date: Mar. 27, 2013

(87) PCT Pub. No.: WO2012/030969
PCT Pub. Date: Mar. 8, 2012

(65) Prior Publication Data
US 2013/0211017 A1      Aug. 15, 2013

(30) Foreign Application Priority Data
Sep. 1, 2010    (WO) ................ PCT/US2010/047536

(51) Int. Cl.
*C08G 59/18*     (2006.01)
*C08G 59/20*     (2006.01)
*C08G 59/64*     (2006.01)
*C08G 59/06*     (2006.01)
*C08G 59/50*     (2006.01)
*C08G 59/02*     (2006.01)

(52) U.S. Cl.
CPC .............. *C08G 59/64* (2013.01); *C08G 59/066* (2013.01); *C08G 59/50* (2013.01)

(58) Field of Classification Search
CPC ....................................................... C08G 59/18
USPC ......................................... 528/418, 403, 421
See application file for complete search history.

(56) References Cited

FOREIGN PATENT DOCUMENTS

EP            0510265        * 10/1992

* cited by examiner

Primary Examiner — Duc Truong

(57) ABSTRACT

Thermoset elastomer compositions are disclosed. Such elastomers are the reaction product of (a) an ambient temperature liquid epoxy-terminated prepolymer formed by reacting a polyoxyalkyleneamine having a molecular weight of from 3000 to 20,000 with an excess of epoxide, wherein the polyoxyalkyleneamine has at least 3 active hydrogen atoms and (b) a curing agent comprising at least one amine or polyamine having an equivalent weight of less than 200 and having 2 to 5 active hydrogen atoms. Such elastomers can be used in applications such as for sealants, adhesives, coatings, gaskets, jointing and cast elastomers.

8 Claims, No Drawings

ELASTOMERIC EPOXY MATERIALS AND THE USE THEREOF

FIELD OF THE INVENTION

This invention relates to the field of elastomers for applications such as sealants, adhesives, coatings, gaskets, jointing and cast elastomers.

BACKGROUND OF THE INVENTION

The main types of thermoset elastomers include polyurethanes, two-part silicones, and vulcanized rubber; each of theses elastomer has positive and negative attributes. Polyurethanes are formed from the reaction of a polyol and isocyanate and are preferred for the ease of processing, wide range of mechanical properties that can be obtained depending on the components chosen, and good adhesive properties to a range of substrates. Polyurethanes are generally limited in their thermal and hydrolytic stability.

Two-part cast silicone elastomers and vulcanized rubbers typically have thermal and hydrolytic stabilities that exceed polyurethanes, however; their application is generally limited to softer systems, less than about 80 Shore A, that normally require long cure and demold times, e.g., 15 hours or more. Vulcanized rubbers also require high temperature molding processes that limit their use in field applications, form fitting, or assembly applications without the use of additional primers and adhesives for bonding. Silicones can be cast at ambient temperatures but suffer the same deficiencies as vulcanized rubbers in terms of adhesion and are generally more expensive than urethane systems.

There therefore remains a need to have elastomer which has polyurethane like processing and mechanical properties with improved thermal and hydrolytic stabilities.

SUMMARY OF THE INVENTION

This invention provides an amine cured epoxy material that combines the processing, mechanical and adhesion properties of polyurethane elastomers with the thermal and hydrolytic stability typically associated with epoxy materials. In one embodiment the elastomer comprises the reaction product of (a) an ambient temperature liquid epoxy-terminated prepolymer formed by reacting one or more polyether-polyamines having a molecular weight of from 3,000 to 20,000 with a molar excess of epoxide, wherein the polyether-polyamine has at least 3 active hydrogens and (b) a curing agent comprising at least one amine or polyamine having an equivalent weight of less than 200 and having 2 to 5 active hydrogen atoms.

In another embodiment a method of producing an elastomer is disclosed. The method comprises contacting under reaction conditions (a) an ambient temperature liquid epoxy-terminated prepolymer formed by reacting one or more polyether-polyamines having a molecular weight of from 3,000 to 20,000 with a molar excess of epoxide, wherein the polyether-polyamine has at least 3 active hydrogens and (b) a curing agent comprising at least one amine or polyamine having an equivalent weight of less than 200 and having 2 to 5 active hydrogen atoms with a curing agent as disclosed above.

In a further embodiment, an elastomeric, amine cured epoxy materials with improved low temperature flexibility is provided.

In a further embodiment, an elastomer is produced in one-shot processing comprising the reactions product of i) at least one polyether-polyamine having a molecular weight of from 3,000 to 20,000 and having at least 3 active hydrogens, ii) at least one epoxide and iii) a curing agent comprising at least one amine or polyamine having an equivalent weight of less than 200 and having 2 to 5 active hydrogen atoms.

DESCRIPTION OF EMBODIMENTS OF THE INVENTION

The present inventions relates to elastomeric materials formed via the reaction of epoxides and amine curatives. Such elastomers are generally suitable for applications where thermoset elastomers with high flexibility and good hydrolysis resistance are needed. The elastomeric materials of the invention may be used generally in the areas of coatings, sealants, adhesives, gaskets, potting, jointing or casting. The elastomeric materials of the present invention may also be used in the automotive industry for engine mounts and suspension bushings. In particular, such elastomeric materials are prepared from amine curing of an epoxy-terminated prepolymer.

The elastomer resins are synthesized in at least two steps: first an epoxy-terminated prepolymer is formed and in the second step, the prepolymer is cured by an amine to form the final epoxy-based elastomer. For ease of manufacturing the final product, it is desirable that the prepolymer formed is a liquid at ambient conditions to promote flow especially when filling complex molds. In a further embodiment, it is desirable that both the epoxy-terminated prepolymer and amine curing agent are liquid at ambient temperature. Based on the use of an amine-terminated polyether polyol in the formation of the epoxy prepolymer, followed by curing with an amine, the final elastomer contains "soft" structural segments, provided by the polyether. The epoxy portion, when reacted with suitable short polyfunctional amines, provides "hard" structural elements recurring along the ultimate elastomeric polymer chain.

The epoxy-based elastomer, not including any filler, will generally display a percent elongation of greater than 50. In further embodiments the epoxy-based elastomer will have an elongation of at least 60, 70 or 80 percent. When a mono-amine curing agent, such as an alkanolamine curing agent is used, the elongation will generally be greater than 100%. In further embodiments the epoxy-based elastomer will have an elongation of at least 110 and in further embodiments 120% or greater.

In a further embodiment, the presence of the soft and hard segments provide for an epoxy-based elastomer having at least one Tg of less of less than 0° C. The term "Tg" is used to mean the glass transition temperature and is measured via Differential Scanning calorimetry (DSC). In a further embodiment, the epoxy-based elastomer will have at least one Tg of less than −15° C., −20° C., −30° C., or less than −40° C. In a further embodiment, the epoxy-based elastomer will have at least one Tg of less than −20° C. and at least one Tg of greater than 50° C.

The epoxy based materials can generally be used in environments where the temperatures are up to about 180° C.

The epoxy-based elastomers of the present invention, without the addition of fillers, generally have a thermal conductivity of less than 0.18 W/m*K, as determined by ASTM C518. In a further embodiment, the elastomers of the present invention have a thermal conductivity of less than 0.16 W/m*K. The thermal conductivity may be further reduced with the addition of hollow spheres, such as glass bubbles.

It was unexpected an epoxy-based elastomer would display the flexibility needed for various applications, have good hydrolytic stability, display a good cure profile, and have good insulation properties (low thermal conductivity).

In the present invention, the epoxy-terminated prepolymer is formed by the reaction of a polyoxyalkyleneamine with an epoxy resin. The polyoxyalkyleneamine may also be referred to as an amine terminated polyether. Generally the polyoxyalkyleneamine will have an average molecular weight of at least 3,000. Generally the polyoxyalkyleneamine will have an average molecular weight of less than 20,000. In a further embodiment the polyoxyalkyleneamine will have a molecular weight of at least 3,500. The polyether polyols for producing the polyoxyalkyleneamine are generally obtained by addition of a $C_2$ to $C_8$ alkylene oxide to an initiator having a nominal functionality of 2 to 6, that is, having 2 to 6 active hydrogen atoms. In further embodiments, the alkylene oxide will contain 2 to 4 carbon atoms such as ethylene oxide, propylene oxide, butylene oxide and mixtures thereof. When two or more oxides are used, they may be present as random mixtures or as blocks of one or the other polyether. In a preferred embodiment the polyether polyol will be liquid at room temperatures. In a further embodiment the ethylene oxide content of the polyether polyol will be less than 30, less than 25, less than 20 or less than 15 weight percent ethylene oxide. In one embodiment the polyether polyol is a poly(oxypropylene)polyol. Catalysis for polymerization of alkylene oxide to an initiator can be either anionic or cationic. Commonly used catalysts for polymerization of alkylene oxides include KOH, CsOH, boron trifluoride, a double cyanide complex (DMC) catalyst such as zinc hexacyanocobaltate or quaternary phosphazenium compound.

Examples of commonly used initiators include glycerol, trimethylol propane, sucrose, sorbitol, pentaerythritol, ethylene diamine and aminoalcohols, such as, ethanolamine, diethanolamine, and triethanolamine. In a further embodiment the initiator for the polyether contains from 3 to 4 active hydrogen atoms. In a further embodiment, the initiator is a polyhydric initiator.

The polyols will have an equivalent weight of at least about 500 and preferably at least about 750 up to about 1,500 or up to about 2,000. In one embodiment, polyether polyols having a molecular weight of 4,000 and above, based on trihydric initiators are used.

The conversion of the polyether to a polyoxyalkyleneamine can be done by methods known in the art. For example by reductive amination, as described, for example in U.S. Pat. No. 3,654,370, the contents of which are incorporated by reference.

Polyoxyalkyleneamines may be represented by the general formula

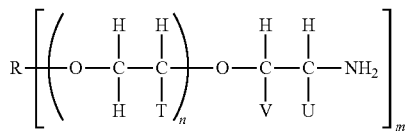

wherein R is the nucleus of an oxyalkylation-susceptible initiator containing 2-12 carbon atoms and 2 to 8 active hydrogen groups, U is an alkyl group containing 1-4 carbon atoms, T and V are independently hydrogen or U, n is number selected to provide a polyol having a molecular weight of as described above and m is an integer of 2 to 8 corresponding to the number of active hydrogen groups originally present in the initiator. In one embodiment, n will have a value of 35 to 100. In a further embodiment R has 2 to 6 or 2 to 4 active hydrogen groups. In another embodiment, the active hydrogen groups are hydroxyl groups. In another embodiment, R is an aliphatic polyhydric initiator. In a further embodiment, R has 3 active hydrogen groups. In further embodiments, n will be less than 90, less than 80, less than 75, or less than 65. In a further embodiment U, T and V are each methyl. Based on the molecular weight of the polyol, the polyoxyalkyleneamine will generally have an amine equivalent weight of from about 900 to about 4,000. In a further embodiment the amine equivalent weight will be less than 3,000. In the practice of this invention, a single molecular weight polyoxyalkyleneamine may be used. Also, mixtures of different polyoxyalkyleneamines, such as mixtures of tri- and higher functional materials and/or different molecular weight or different chemical composition materials, may be used.

Examples of polyoxyalkyleneamine commercially available, are for examples; JEFFAMINE™ D-4000 and JEFFAMINE™ T-5000 form Huntsman Corporation.

The epoxy resins used in producing the epoxy terminated prepolymers are compounds containing at least one vicinal epoxy group. The epoxy resin may be saturated or unsaturated, aliphatic, cycloaliphatic, aromatic or heterocyclic and may be substituted. The epoxy resin may also be monomeric or polymeric.

In one embodiment, the epoxy resin component is a polyepoxide. Polyepoxide as used herein refers to a compound or mixture of compounds wherein at least one of the compounds contains more than one epoxy moiety. Polyepoxide as used herein also includes advanced or partially advanced epoxy resins, that is, the reaction of a polyepoxide and a chain extender, wherein the resulting epoxy reaction product has, on average, more than one unreacted epoxide unit per molecule. The epoxy resin component may be a solid or liquid at ambient temperature (10° C. and above). Generally, a "solid epoxy resin" or "SER" is an epoxy-functional resin that has a Tg generally greater than about 30° C. While the epoxy resin may be a solid, the final epoxy terminated prepolymer will be a liquid at ambient temperature. For ease of handling, in one embodiment the epoxy resin is a liquid at ambient temperatures.

In one embodiment the epoxy resin may be represented by the formula

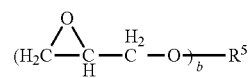

wherein $R^5$ is C6 to C18 substituted or unsubstituted aromatic, a C1 to C8 alphatic, or cycloaliphatic; or heterocyclic polyvalent group and b has an average value of from 1 to less than about 8.

Aliphatic polyepoxides may be prepared from the known reaction of epihalohydrins and polyglycols. Examples of aliphatic epoxides include trimethylpropane epoxide, and diglycidyl-1,2-cyclohexane dicarboxylate.

Other epoxies which can be employed herein include, epoxy resins such as, for example, the glycidyl ethers of polyhydric phenols or epoxy resins prepared from an epihalohydrin and a phenol or phenol type compound.

The phenol type compound includes compounds having an average of more than one aromatic hydroxyl group per molecule. Examples of phenol type compounds include dihydroxy phenols, biphenols, bisphenols, halogenated biphenols, halogenated bisphenols, hydrogenated bisphenols, alkylated biphenols, alkylated bisphenols, trisphenols, phenol-aldehyde resins, novolac resins (i.e. the reaction product of phenols and simple aldehydes, preferably formaldehyde), halogenated phenol-aldehyde novolac resins, substituted phenol-aldehyde novolac resins, phenol-hydrocarbon resins, substituted phenol-hydrocarbon resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins, or combinations thereof.

Examples of bisphenol A based epoxy resins useful in the present invention include commercially available resins such as D.E.R.™ 300 series and D.E.R.™ 600 series, commercially available from The Dow Chemical Company. Examples of epoxy novolac resins useful in the present invention include commercially available resins such as D.E.N.™ 400 series, commercially available from The Dow Chemical Company.

In a further embodiment, the epoxy resin compounds may be a resin from an epihalohydrin and resorcinol, catechol, hydroquinone, biphenol, bisphenol A, bisphenol AP (1,1-bis (4-hydroxyphenyl)-1-phenyl ethane), bisphenol F, bisphenol K, bisphenol S, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins, tetramethylbiphenol, tetramethyl-tetrabromobiphenol, tetramethyltribromobiphenol, tetrachlorobisphenol A, or combinations thereof.

In another embodiment, the epoxy resin includes those resins produced from an epihalohydrin and an amine. Suitable amines include diaminodiphenylmethane, aminophenol, xylene diamine, anilines, and the like, or combinations thereof.

In another embodiment, include those resins produced from an epihalohydrin and a carboxylic acid. Suitable carboxylic acids include phthalic acid, isophthalic acid, terephthalic acid, tetrahydro- and/or hexahydrophthalic acid, endomethylenetetrahydrophthalic acid, isophthalic acid, methylhexahydrophthalic acid, and the like or combinations thereof.

Other useful epoxide compounds which can be used in the practice of the present invention are cycloaliphatic epoxides. A cycloaliphatic epoxide consists of a saturated carbon ring having an epoxy oxygen bonded to two vicinal atoms in the carbon ring for example as illustrated by the following general formula:

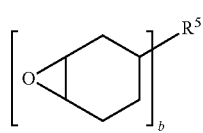

wherein $R^5$ and b are as defined above.

The cycloaliphatic epoxide may be a monoepoxide, a diepoxide, a polyepoxide, or a mixture of those. For example, any of the cycloaliphatic epoxide described in U.S. Pat. No. 3,686,359, incorporated herein by reference, may be used in the present invention. As an illustration, the cycloaliphatic epoxides that may be used in the present invention include, for example, (3,4-epoxycyclohexyl-methyl)-3,4-epoxy-cyclohexane carboxylate, bis-(3,4-epoxycyclohexyl) adipate, vinylcyclohexene monoxide and mixtures thereof.

Another class of epoxy resins useful in the present invention are based on divinylarene oxide product illustrated generally by general chemical Structures I-IV as follows

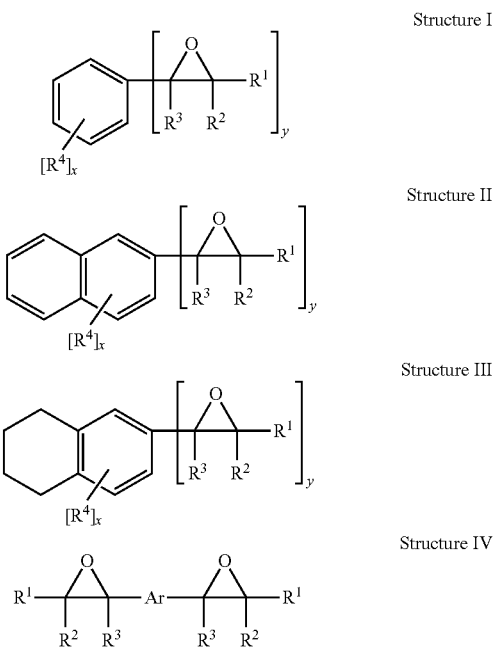

In the above Structures I, II, III and IV of the divinylarene dioxide product of the present invention, each $R^1$, $R^2$, $R^3$ and $R^4$ individually may be hydrogen, an alkyl, cycloalkyl, an aryl or an aralkyl group; or a oxidant-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group.

In certain embodiments of the divinylarene dioxide products the alkyl moiety will have from 1 to 36 carbon atoms. In further embodiments the alkyl will have less than 24, or less than 18 carbon atoms. In further embodiments the alkyl will have from 1 to 8 or from 1 to 6 carbon atoms. Similarly the cycloalkyl will contain from 5 to 36 carbon atoms. Generally the cycloalkyl will contain from 5 to 24 carbon atoms.

The aryl moiety present in the divinylarene dioxide will generally contain 12 carbon atoms or less. An aralkyl group will generally contain 6 to 20 carbon atoms.

The divinylarene dioxide product produced by the process of the present invention may include for example alkyl-vinylarene monoxides depending on the presence of alkylvinylarene in the starting material.

In one embodiment of the present invention, the divinylarene dioxide produced by the process of the present invention may include for example divinylbenzene dioxide, divinylnaphthalene dioxide, divinylbiphenyl dioxide, divinyldiphenylether dioxide, and mixtures thereof.

Optionally, the epoxy resin may also contain a halogenated or halogen-containing epoxy resin compound. Halogen-containing epoxy resins are compounds containing at least one vicinal epoxy group and at least one halogen. The halogen can be, for example, chlorine or bromine, and is preferably bromine. Examples of halogen-containing epoxy resins useful in the present invention include diglycidyl ether of tetrabromobisphenol A and derivatives thereof. Examples of the epoxy resin useful in the present invention include commercially available resins such as D.E.R.™ 500 series, commercially available from The Dow Chemical Company.

In general, the epoxy resin has a number average molecular weight of less than 20,000, preferably less than 10,000, and more preferably less than 8,000. Generally, the epoxy resins useful in the present invention have an average molecular weight of from about 200 to about 10,000, preferably from about 200 to about 5,000, and more preferably from about 200 to about 1,000.

The epoxide equivalent weight of the epoxy resins is generally from about 100 to about 8000 and more preferably from about 100 to about 4000. As used herein the terms "epoxide equivalent weight" ("EEW") refers to the average molecular weight of the polyepoxide molecule divided by the average number of oxirane groups present in the molecule. The diepoxides useful in the present invention are the epoxy resins having an epoxy equivalent weight of from about 100 to about 500.

The relative amount of epoxy resin employed to make the prepolymer can be varied over wide ranges. Generally the epoxy resin used should be at present in a ratio of at least 3 epoxy groups per amino hydrogen atoms to avoid prepolymer gelling. In further embodiments the ratio of oxirane moieties per amine hydrogen is at least 5, at least 10 and generally up to 20 to 1. In one embodiment, the prepolymer is formed by reacting no less than 4 moles of polyepoxide resin per mole of diamine at temperatures in the range of about 80° C. for not less than 1 hour with constant stirring. Exact temperatures and duration depend on the reactivity of the polyepoxide resins being utilized.

The conditions for reaction of the epoxy resin with the polyoxyalkyleneamine are well known in the art. Generally, when using a polyoxyalkyleneamine and epoxy resin which a liquid at ambient temperatures, no solvent is needed. To promote the reaction, the mixture of polyoxyalkyleneamine and epoxy resin is heated to between 70 to 150° C. for sufficient time to react the reactive hydrogen atoms available. Optionally the reaction may be carried out in the presence of conventional catalysts that promote the reaction between amines and epoxides. Optionally the reaction may be carried out in the presence of solvents suitable for dissolving the amine and/or epoxy.

In one embodiment, the final epoxy-terminated prepolymer will be a liquid at ambient temperature, that is, generally a liquid at 25° C. and above. In a further embodiment, the epoxy-terminated prepolymer will be a liquid at 20° C. and above. In another embodiment the epoxy-terminated prepolymer will be a liquid at 15° C. and above. By liquid, it is inferred that the material is pourable or pumpable.

In the second step of making the epoxy based elastomer of the present invention, the epoxy prepolymer is reacted with an amine terminated curing agent. The amine curing agent is a monoamine or a polyamine having an equivalent weight of less than 200 and having 2 to 5 active hydrogen atoms. Generally the amine curing agent will have an equivalent weight of at least 20. The amino equivalent weight means the molecular weight of the curing agent divided by the number of amine active hydrogen atoms. In a further embodiment, the amine or polyamine has from 2 to 4 active hydrogen atoms. In yet another embodiment, the amine curing agent has 2 amino active hydrogen atoms.

The curing of the elastomer is generally done at a temperature higher than ambient temperature. At is it generally desirable to have a short curing time when making articles, the amine curing agent is selected to give a curing time (demold) of less than 30 minutes when the molds are heated at approximately 100° C. In a further embodiment, the curing time is less than 20 minutes. In a further embodiment the curing time is less than 15 minutes. The amine curing agent is generally added to provide 0.8 to 1.5 amine equivalents (NH) per epoxy reactive group. In a further embodiment the ratio is from 0.9 to 1.1.

Examples of suitable amine curing agents for use in the present invention include those represented by the following formula:

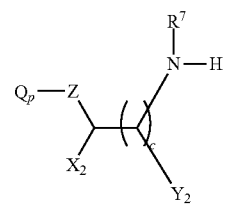

wherein $R^7$, Q, X, and Y at each occurrence are independently H, C1-C14 aliphatic, C3-C10 cycloaliphatic, or C6-C14 aromatic or X and Y can link to form a cyclic structure;

Z is O, C, S, N, or P; and c is 1 to 8: p is 1 to 3 depending on the valence of Z In one embodiment Z is oxygen. In a further embodiment Z is oxygen and $R^7$ is hydrogen. In another embodiment X and Y are both hydrogen.

Cyclic diamine as represented by the following formula may also be used a curing agents in the present invention:

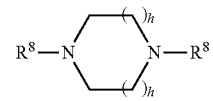

wherein $R^8$ at each occurrence is independently H or —CH2CH2NH2 and h is 0-2 with the proviso that both h's cannot be 0.

Aromatic amine curing agents may also be used such as toluene-2,4-diamine; toluene-2,6-diamine, isomers of phenylene diamine; aniline; and the like.

In another embodiment the amine curing agent can be the steric and geometric isomers of isophorone diamine, cyclohexane-diyldimethanamine, or cyclohexane diamine.

Examples of specific amine-terminated curing agents include: monoethanolamine; 1-amino-2-propanol; 1-amino-3-propanol; 1-amino-2-butanol; 2-amino-1-butanol; isophorone diamine; piperazine; homopiperazine; butylamine; ethylene diamine; hexamethylene diamine; and mixtures thereof. In one embodiment the amine curing agent is an alkanolamine.

In a further embodiment, amine terminated polyethers having an equivalent weight of less than 200, such as JEFFAMINE™ D-400 from Huntsman Chemical Company.

In certain embodiments, the curing may contain a combination of an aliphatic and an aromatic curing agent to have a staged curing process. The combination of amine curing agents allows a first curing step, generally done at 70 to 80° C. whereby the aliphatic amine reacts with the epoxy moiety to form a prepreg, and a second curing step done at temperatures above 80° C. for curing with the aromatic amine.

If desired, other additives which may be used with the elastomers of the present invention include flame retarding agents, plasticizers, antioxidants, UV stabilizers, adhesion promoters, dyes, pigments, fillers, and reinforcing agents. For example, for modifying the thermal conductivity, fillers such as glass hollow spheres may be added. If desired, viscosity modifying agents known in the art may be added. Examples of such additives include diglycidyl ether of butane diol, glycidyl ethers of fatty acid or natural oils or TEP (tri ethyl phosphate, (C2H5)3PO4).

In another aspect of the present invention, a process for providing an epoxy based material coating on a surface is provided. The process comprises the steps of
providing a surface to be coated;
providing an epoxy terminated prepolymer;
providing an amine terminated curing agent;
bringing the epoxy terminate prepolymer and amine terminated curing agent, into contact with said surface and reacting said epoxy terminated prepolymer and amine terminated curing agent thereby providing an epoxy based coating.

The epoxy based material can be applied as one or more layers to a surface by known methods in the art, such as spraying, brush coating, extrusion, immersion or flooding or by means of rollers or doctor applicators. The epoxy based material is suitable for formation of coating on essential any surface, such as metals, plastics, wood, concrete, asphalt or glass. The epoxy based materials may be used in conjunction with other layers, such as an anticorrosion layer or adhesion promoting layer. The elastomers may also comprise at least one layer of a multi-layered coating. For example, the epoxy based materials may be overlayed with an additional layer of material, such as paint, a silicone, polyurethane, epoxy, or polyolefin.

When used as a coating, the coating provided may have a thickness in the range up to 10 mm, typically in the range of 0.1 to 10 mm. In a further embodiment the coating will have a density of more than 0.5 g/cm$^3$.

The epoxy based material may also be used in cast molding for the production of molded article such as wheels or automotive parts. In production of such materials, the epoxy terminated prepolymer, curing agent and optional additives are introduced into a mold, the mold is closed and the reaction mixture is allowed to cure. In such applications, the mold is generally heated to between 80° C. and 120° C.

The elastomeric resin may also be produced by a one shot-method wherein the amine terminated polyether, epoxy resin, curing agent and optionally additional additives, are mixed at 50 to 150° C. and then dispersed such as by pouring into a mold or spraying onto a surface to be coated. In such a one shot process, an epoxy-terminated prepolymer can not be isolated as per the two step process described above. In such a one-shot process, the cure and demold times are generally from 3 to 24 hours at 125° C.

The following examples are provided to illustrate the invention, but are not intended to limit the scope thereof. All parts and percentages are by weight unless otherwise indicated.

EXAMPLES

Example 1

Production of Epoxy Terminated Prepolymer

A 20 gallon stainless steel reactor is charged with 49.6 kg of DER™ 383 liquid epoxy resin, a reaction product of epichlorohydrin and bisphenol A, available from The Dow Chemical Company (epoxy equivalent weight=180.1 g/mol) with agitation followed by addition of 52.3 kg of Jeffamine™ T5000 polyoxyalkyleneamine, a polyoxypropylene triamine with a nominal molar mass of 5000 g/mol available from Huntsman Corp. (amine equivalent weight=952 g/mol). The vessel is degassed, padded with nitrogen and the temperature slowly increased to 125° C. via a heated jacket. The internal temperature is maintained at 120° C. and held for three hours. The vessel is then cooled to 80° C., the agitator stopped and the sample discharged. The epoxy terminated prepolymer is found to be a viscous liquid at 25° C. (approximately 90,000 cPs) with a measurable epoxy equivalent weight of 412 g/mol (463 actual).

Examples 2 to 5

Elastomer Preparation

The epoxy terminated prepolymer prepared in Example 1, is added to lidded cups suitable for use in a FlackTek SpeedMixer™ and the sample mixed for 30 seconds at 800 rpm, then mixed at 2350 rpm for 1 minute to remove bubbles and then heated in a 54° C. oven. Then amine curing agent is added according to the formulations in the Table 1, the values are in parts by weight.

TABLE 1

|  | 2 | 3 | 4 | 5 | 6 | C1* |
|---|---|---|---|---|---|---|
| Epoxy Prepolymer from Example 1 | 100 | 100 | 100 | 100 | 100 | 100 |
| monoethanolamine | 6.6 |  |  |  | 5.0 |  |
| 1-amino-2-propanol |  | 8.1 |  |  |  |  |
| 1-amino-3-propanol |  |  | 8.1 |  |  |  |
| 2-amino-1-butanol |  |  |  | 9.6 |  |  |
| Triethylene tetramine |  |  |  |  | 1.0 | 5.2 |

*Example C1 is a comparative.

After addition of the curing agent, the samples are mixed on a FlackTek SpeedMixer for 30 seconds at 800 rpm followed by 2350 rpm for 1 minute. The mixtures are then poured into closed aluminum molds that are preheated to 100° C. and treated with a mold release agent. The molds are placed back into the 100° C. oven and allowed to cure for approximately 1 hour, demolded and cooled to room temperature for 24 hours. Tensile properties are then measured according to ASTM D1708 and thermal properties are measured via Differential Scanning calorimetry by cutting approximately 10 mg samples and placing the samples in aluminum pans. The DSC procedure is to cool the samples to −90° C. then ramp to 200° C. at a rate of 10° C./min. The thermal cycle is repeated and the onset of glass transition temperatures is measured on the second upward scan. The measured properties of the produced elastomers are given in Table 2.

TABLE 2

|  | Tensile Strength (MPa) | Elongation at Break (%) | Stress at 100% Strain (MPa) | Shore A Hardness | Tg1 (° C.) | Tg2 (° C.) |
|---|---|---|---|---|---|---|
| Example 2 | 7.60 | 160 | 4.3 | 76 | −55 | 73 |
| Example 3 | 11.70 | 250 | 7 | 92 | −55 | 37 |
| Example 4 | 7.70 | 200 | 3.5 | 76 | −55 | 59 |
| Example 5 | 5.9 | 600 | 1 | 81 | −56 | 17 |
| Example 6 | 9.5 | 117 | 8.3 | 85 | −55 | 5 |
| Example C1 | 7.3 | 60 | N/A | 88 | −55 | None detected |

The results show the use high functional curing agent (triethylene tetramine) has a deleterious effect on the properties of the produced elastomers.

Examples 7 and 8

The epoxy terminated prepolymer prepared in Example 1, is added to lidded cups suitable for use in a FlackTek Speed-Mixer and the sample mixed for 30 seconds at 800 rpm, then mixed at 2350 rpm for 1 minute to remove bubbles and then heated in a 54° C. oven. Then amine curing agent and DMP 30 (2,4,6-tris(dimethylaminomethyl) phenol) as catalyst were added according to the formulations in the Table 3.

TABLE 3

|  | 7 | 8 |
|---|---|---|
| Epoxy Prepolymer from Example 1 | 100 | 100 |
| monoethanolamine | 6.6 |  |
| 1-amino-2-propanol |  | 8.1 |
| DMP 30 | 3.2 | 3.2 |

After addition of the curing agent and catalyst, the samples are Speedmixed for 30 seconds at 800 rpm followed by 2350 rpm for 1 minute. The mixtures are then poured into closed, vertical molds that are preheated to 100° C. treated with a mold release agent. The molds are placed back into the 100° C. oven, allowed to cure for 12 minutes then demolded and cooled to room temperature for 24 hours. Tensile properties and DSC measurements are done as described above.

TABLE 4

|  | Tensile Strength (MPa) | Elongation at Break (%) | Shore A Hardness | Tg1 (° C.) | Tg2 (° C.) |
|---|---|---|---|---|---|
| Example 7 | 12.1 | 160 | 83–87 | −55 | 85 |
| Example 8 | 15.4 | 210 | 93–97 | −55 | 61 |

The results show the addition of the catalyst generally improves the strength and hardness properties of the elastomers without increasing the primary glass transition temperature.

Example 9

Thermo-Oxidative Testing of Elastomers According to ASTM D2000

Elastomers produced according the procedure of Example 2 are tested for thermo-oxidative stability. Microtensile dogbone samples suitable for testing via ASTM D1708 are cut from the sample and these specimens were aged in an air-forced oven for 70 hours at temperatures of 70, 100, 125, and 150° C. The samples are allowed to cool to room temperature and stand for a minimum of 24 hours before microtensile testing. The tensile properties of the fresh and aged samples and are reported in Table 5. The values are the average of 4 tensile specimens.

TABLE 5

|  | Tensile Strength (MPa) | Elongation at Break (%) | Stress at 100% Strain (MPa) | Shore A Hardness |
|---|---|---|---|---|
| Unaged | 7.9 | 165 | 4.3 | 77–78 |
| 70° C. Aged | 7.8 | 148 | 4.8 | 79–80 |
| 100° C. Aged | 9.5 | 169 | 5.0 | 79–81 |
| 125° C. Aged | 9.2 | 184 | 4.3 | 78–79 |
| 150° C. Aged | 9.7 | 241 | 3.1 | 73–74 |

Following the ageing cycle, there is not a significant reduction in the mechanical properties of the produce elasomters indicating good thermo-oxidative stability.

Example 10

Solvent Resistance Testing of Elastomer

Elastomers produced according the procedure of Example 2 are tested to resistance to common solvents. Microtensile dogbone samples suitable for testing via ASTM D1708 as well as blocks of nominal dimensions of 1"×1"×0.1" are cut and these samples were weighed and immersed in solvents according to the Table 8 for 7 days at approximately 23° C. The aging test in IRM 903 oil is performed at 120° C. for 72 hours. The results from testing are given in Table 6.

TABLE 6

| Solvent | % -Mass Change | Shore A Hardness |
|---|---|---|
| Unaged Sample | — | 74–78 |
| Water | +3.8 | 67 |
| 100% Ethanol | +73 | 45 |
| 50% Acetic Acid | +291 | 10 |
| Hexane | +18 | 69 |
| Acetone | +101 | 42 |
| Methylene Chloride | +329 | 36 |
| IRM 903 (72 h @120° C.) | +24 | 72 |

After aging the samples are extracted and the blocks weighed to determine the degree of swelling and tested for hardness. The ASTM D1708 samples were dried overnight in a 70° C. forced air oven, allowed to cool to room temperature for at least 24 hours and then tested for retention of tensile properties. The specimens aged in IRM 903 oil are not subject to the drying step. The results from the test are given in Table 7.

TABLE 7

|  | Tensile Strength (MPa) | Elongation at Break (%) | Stress at 100% Strain (MPa) |
|---|---|---|---|
| Unaged Sample | 7.9 | 165 | 4.3 |
| Water | 9.6 | 160 | 5.4 |
| 100% Ethanol | 9.5 | 160 | 5.5 |
| 50% Acetic Acid | Not Tested | Not Tested | Not Tested |
| Hexane | 9.6 | 157 | 5.6 |
| Acetone | 10.8 | 174 | 5.7 |
| Methylene Chloride | 10.8 | 167 | 6.2 |
| IRM 903 (No Post-dry) | 6.1 | 161 | 3.2 |

The produced elastomers show good resistance to common solvents, except for acetic acid.

Example 12

Hydrolytic Aging of Epoxy Elastomers

Elastomers produced according to the procedure of Examples 2 and 3 are tested for hydrolytic stability. Microtensile dogbone samples suitable for testing via ASTM D1708 are cut from the sample and these specimens along with several cylindrical specimens with dimensions of approximately 2 inches (5 cm) long with 1 inch (2.54 cm) diameter are aged in deionized water in a one gallon stainless steel pressure chamber at 160° C. for time periods of two and four weeks. Following the aging intervals, specimens are removed, allowed to cool to approximately 25° C., and surface dried. Cylinders are measured for weight change and Shore A hardness and compared to the unaged values. Tensile specimens are tested under two conditions. First, specimens re tested for retention of properties within 2 hours of being removed from the pressure chamber. Separate sets of specimens are post-dried in a 60° C. oven overnight to remove any entrained water, allowed to cool to 25° C., and then tested for tensile properties. Tensile data is reported as the average of 5 specimens at each interval. Mass and hardness changes are reported as the average of 3 cylindrical samples. The results from this testing are given in Table 8.

are mixed at a 5-to-1 molar ratio. An elastomer is produced as per the procedure of Example 2 by mixing 100 g of the prepolymer with 8.15 g of 2-propanol amine as the amine curing agent. The mixture is then cast into a square mold window sitting on the parallel-aligned steel panels, covered with a non-stick aluminum sheet, and placed in an oven at 120° C. In a maximum of one hour, the coating is demolded and cut into two pieces using a utility knife. The thickness of the final coating ranges between 1.2 mm and 1.5 mm.

Performance Results (a) Impact Test

The coating specimens are placed in a freezer and cooled to −30° C. for a minimum of one hour before testing. The impact test is performed by a falling 1 kg mass on the panel with impact energy of at least 3.0 J per mm of actual coating thickness. Three impacts are completed within 30 sec of removal of the specimen from the freezer. Visual observation of the material coated with the elastomer have an essentially

TABLE 8

| | Material from Example 2 - Initial | Material from Example 2 - Two Weeks Aged | Material from Example 2 - Four Weeks Aged | Material from Example 3 - Initial | Material from Example 3 - Two Weeks Aged | Material from Example 3 - Four Weeks Aged |
|---|---|---|---|---|---|---|
| %-Mass Change | — | +6.1 | +7.0 | — | +5.5 | +6.2 |
| Shore A Hardness | 78 | 67 | 67 | 90 | 67 | 67 |
| Tensile Strength (MPa) - No Post-dry | 7.3 | 3.3 | 3.3 | 10.9 | 3.9 | 3.2 |
| Elongation at Break (%) - No Post-dry | 130 | 92 | 101 | 210 | 143 | 148 |
| Tensile Strength (MPa) - After Post-dry | 7.3 | 8.5 | 8.7 | 10.9 | 9.4 | 9.3 |
| Elongation at Break (%) - After Post-dry | 130 | 127 | 138 | 210 | 125 | 121 |

The data from Example 12 show that the materials undergo a change from the initial values to the first aging interval of two weeks but show good stability from two weeks to four weeks for all properties. It is seen from the Example 2 elastomer that the tensile property changes are primarily due to moisture absorption since after the post-drying step the properties return to very near original values. This indicates that the materials have very good resistance to hydrolytic degradation.

Example 13

Coating Preparation

To determine the effectiveness of the elastomers as a protective coating, steel plates are coated with the elastomer and property measurements performed as per systems A1/A2 in accordance with the CSA standards (Z245.20-06, External fusion bond epoxy coating for steel pipe).

An epoxy terminated prepolymer is prepared per the procedure of Example 1 wherein DER 383 and Jeffamine T5000 damage free surface, that is, no observed delamination or cracks in the coating surface. It is believed the damage resistance of the elastomers is due to the presence of the soft segments, which are phase separated from the hard segments, with the glass transition temperature lower than −30° C.

For comparison of the impact resistance test, an epoxy coating, based on the formulation given in Table 8, is powder coated onto 3×8 inch (7.6×20.3 cm) steel plates with a thickness of approximately 10 mil.

TABLE 8

| Formulation of FBE powder coating | |
|---|---|
| | C2 |
| DER 664 UE | 592.4 |
| Amicure CG-1200 (DICY | 8.1 |

TABLE 8-continued

Formulation of FBE powder coating

|  | C2 |
|---|---|
| EpiCure P101 | 7.5 |
| Modaflow Powder III | 10.0 |
| Vansil W20 | 382.0 |

Visual observation of the impact test shows clear impact marks of the falling mass on the FBE coated surface.

(b) Cathodic Disbondment (CD) Test

A 3.0 mm diameter holiday is drilled in the center of the test specimen through the elastomer coating to expose the steel substrate in 3% saline solution under two different corrosion conditions: (a) 3.5 V (negative to the reference) at 65° C. for 48 hours or (b) 1.5 V at 65° C. for 28 days. After 48 hours the elastomer coating showed marginal disbondment from the steel plates; less than 5 mm radius. For the 28 days specimen, a disbondment radius of 5 mm is observed.

(c) Hot Wet Adhesion (HWA) Test

HWA test is carried out by immersing test panels upright in a tap water bath being heated at 75° C. The specimens are removed in 48 hours and 30 mm×15 mm rectangle is scribed through the coating using a utility knife immediately after removal. Using a levering action of the knife, the coating is forced to peel off by inserting the tip of the blade of the knife under the elastomer at each corner of the rectangle. Only marginal delamination is created for the FBE and the elastomer coatings at corners.

(d) Peel Adhesion Test

The test panel is clamped on the horizontal translational sample stage, which virtually slides friction-free through the linear track in a base frame, and installed in an Instron 4505 test instrument at ambient temperature. A 25 mm width strip of the elastomer coating is peeled perpendicularly from the steel panel at a constant crosshead speed of 10 mm/min. Beyond the yield point, the peel adhesion force reaches a steady state of 95.3 N. The CSA standards require 3.0 N and 19.6 N minimum for systems A1 and A2, respectively.

(e) 2.5° Flexibility Test

The elastomer coatings are applied to 1×8 inch (2.5 cm×20.3 cm) steel bars instead of steel plates for flexibility test. The bars are cooled to −30° C. in the freezer and stored for a minimum of one hour prior to the test. Within 30 s of removal, four points on the specimen are subjected to the hydraulic compression to achieve at least 2.5° bending (actual bending of the test bar is 7°). FIG. 4 compares the test bars after flexibility test. Visual observation indicates the elastomer coatings do not show any sign of adhesive or cohesive failure.

Example 14

To determine the performance of the elastomer in double layer coatings, test specimens are prepared by apply a layer of fusion bonded epoxy (FBE) to the test materials followed by the addition of the elastomeric layer over the FBE. Tests are performed for systems B1/B2 defined in accordance with the CSA standards (Z245.21-06, External polyethylene coating for pipe). The conditions for testing of the materials are essentially as per the procedures given in Example 13, with the exception the samples sizes are adjusted according to the CSA standards.

Approximately a 10 mil thick FBE coatings are applied on 3×8 inch (7.6×20.3 cm) steel plates via a powder coating process. Plates with just the FBE layer serve as the controls. The elastomer is produced as per Example 13. The mixture for the elastomer is cast into a square mold window sitting on the parallel-aligned FBE coated panels, covered with a non-stick aluminum sheet, and placed in an oven at 120° C. In a maximum of one hour, the coating is demolded and cut into two pieces using a utility knife. The final elastomer coating thickness ranges from 1.2 mm to 1.5 mm. Visual observation of the test results are as follow:

Impact Test

The single FBE layer coating is regarded as failing due to clear impact marks of falling mass that exposed the metal beneath the coatings. The FBE/elastomer coatings show a partial mark on the FBE primer, however; no delamination, cracks or dents are observed on the elastomer layer.

Cathodic Disbondment (CD) Test

The 48 hour results show that marginal, less than 5 mm disbondment, occurs in the FBE primer from the steel plate for both FBE and FBE/elastomer coating. A maximum of 7 mm radius disbondment is allowed in the CSA standards.

Hot Wet Adhesion (HWA) Test

Only marginal delamination of the FBE coating is created using the knife action for both FBE and FBE/elastomer coatings.

Peel Adhesion Test

The specimens break before delamination from the FBE primer implying the adhesion force between two layers exceeds the cohesive energy of the elastomer layer. At the yield point, it is consistently observed that the peel adhesion force reaches 200 N before failure, which is greater than a threshold (150.0 N) specified in CSA standards.

2.5° Flexibility Test (4 Point Bending)

The FBE primer protected with the elastomer coating did not reveal any sign of adhesive or cohesive failure while multiple cracks and delamination were created along the bars coated with the single FBE layer.

While the foregoing is directed to embodiments of the invention, other and further embodiments of the invention may be devised without departing from the basic scope thereof.

We claim:

1. A thermoset elastomer comprising the reaction product of
(a) an ambient temperature liquid epoxy-terminated prepolymer formed by reacting a polyoxyalkyleneamine having a molecular weight of from 3,000 to 20,000 with an excess of epoxide, wherein the polyoxyalkyleneamine is represented by the formula:

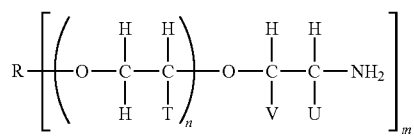

wherein R is the nucleus of an oxyalkylation-susceptible initiator containing 2-12 carbon atoms and 2 to 8 active hydrogen groups, U is an alkyl group containing 1-4 carbon atoms, T and V are independently hydrogen or U, n is number selected to provide a polyol having a molecular weight of 2,900 to 29,500 and m is an integer of 3 to 8 corresponding to the number of active hydrogen and
(b) a curing agent comprising at least one amine or polyamine having an equivalent weight of less than 200 and having 2 to 5 active hydrogen atoms.

2. The elastomer of claim 1 wherein U is an alkyl group containing 1 or 2 carbon groups and T and V are independently hydrogen or an alkyl group containing one carbon.

3. The elastomer of claim 1 wherein the epoxide is at least one or more of the formula

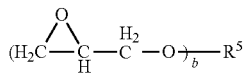

wherein $R^5$ is $C_6$ to $C_{18}$ substituted or unsubstituted aromatic, a $C_1$ to $C_8$ aliphatic, or cycloaliphatic; or heterocyclic polyvalent group and b has an average value of from 1 to less than about 8.

4. The elastomer of claim 3 wherein the epoxide is one or more of diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, bisphenol S, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A, or a combination thereof.

5. The elastomer of claim 1 wherein the epoxide is at least one cycloaliphatic epoxide of the formula

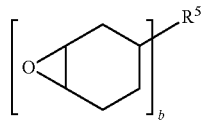

wherein $R^5$ is $C_6$ to $C_{18}$ substituted or unsubstituted aromatic, a $C_1$ to $C_8$ aliphatic, or cycloaliphatic; or heterocyclic polyvalent group and b has an average value of from 1 to less than about 8.

6. The elastomer of claim 1 wherein the epoxide is at least one divinylarene oxide of the following Structures:

Structure I

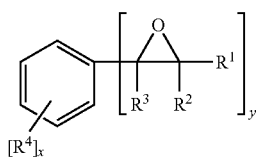

Structure II

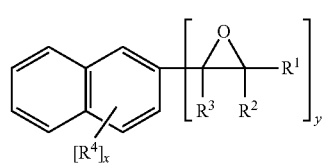

Structure III

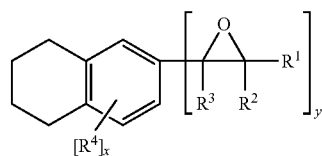

Structure IV

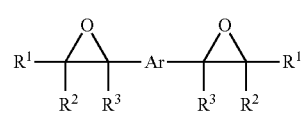

wherein each $R^1$, $R^2$, $R^3$ and $R^4$ is individually hydrogen, an alkyl, cycloalkyl, an aryl or an aralkyl group; or a oxidant-resistant group including for example a halogen, a nitro, an isocyanate, or an RO group, wherein R may be an alkyl, aryl or ar alkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group.

7. The elastomer of claim 1 wherein the amine curing agent is present in an amount to provide 0.8 to 1.5 amine equivalents per epoxy reactive group and the amine curing agent is at least one curing agent represented by the formula:

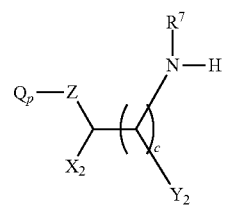

wherein $R^7$, Q, X, and Y at each occurrence are independently H, C1-C14 aliphatic, $C_3$-$C_{10}$ cycloaliphatic, or $C_6$-$C_{14}$ aromatic or X and Y can link to form a cyclic structure;

Z is O, C, S, N, or P; and c is 1 to 8: p is 1 to 3 depending on the valence of Z.

8. The elastomer of claim 7 wherein the amine curing agent is represented by the formula

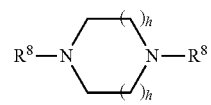

wherein $R^8$ at each occurrence is independently H or —$CH_2CH_2NH_2$ and h is 0-2 with the proviso that both h's cannot be 0.

* * * * *